(12) United States Patent
Yasuda

(10) Patent No.: US 11,395,480 B2
(45) Date of Patent: Jul. 26, 2022

(54) FISHING REEL

(71) Applicant: GLOBERIDE, Inc., Tokyo (JP)

(72) Inventor: Hiromu Yasuda, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 17/158,254

(22) Filed: Jan. 26, 2021

(65) Prior Publication Data

US 2021/0298280 A1  Sep. 30, 2021

(30) Foreign Application Priority Data

Mar. 24, 2020 (JP) .............................. JP2020-052043

(51) Int. Cl.
| | |
|---|---|
| *A01K 89/01* | (2006.01) |
| *A01K 89/017* | (2006.01) |
| *A01K 89/015* | (2006.01) |

(52) U.S. Cl.
CPC ........ *A01K 89/017* (2013.01); *A01K 89/0186* (2015.05); *A01K 89/01912* (2015.05); *A01K 89/01925* (2015.05); *A01K 89/01931* (2015.05)

(58) Field of Classification Search
CPC .............. A01K 89/017; A01K 89/0155; A01K 89/0173; A01K 89/01901; A01K 89/01912; A01K 89/0186
See application file for complete search history.

(56) References Cited

U.S. PATENT DOCUMENTS

2017/0172130 A1* 6/2017 Komemushi ......... G01P 15/165

FOREIGN PATENT DOCUMENTS

| CN | 104012480 A | * | 9/2014 | .......... A01K 89/017 |
|---|---|---|---|---|
| CN | 102613149 B | * | 12/2015 | .......... A01K 89/017 |
| CN | 102613151 B | * | 6/2016 | .......... A01K 89/017 |
| CN | 107182963 A | * | 9/2017 | .......... A01K 89/015 |
| JP | H05-168380 | | 7/1993 | |
| JP | H08-001666 Y | | 1/1996 | |
| JP | 2001025342 A | * | 1/2001 | .......... A01K 89/017 |
| JP | 2001-211790 | | 8/2001 | |
| JP | 2002223677 A | | 8/2002 | |
| JP | 2003274823 A | | 9/2003 | |
| JP | 2004-298008 | | 10/2004 | |
| JP | 2006-166816 | | 6/2006 | |
| JP | 2016214125 A | | 12/2016 | |
| JP | 2017055712 A | | 3/2017 | |
| KR | 20130142061 A | * | 12/2013 | .......... A01K 89/017 |

OTHER PUBLICATIONS

Extended European Search Report for related European Application No. 20217547.7; report dated Jun. 22, 2021; (12 pages).
Chinese Office Action for related Chinese Application No. 202110108312.4; action dated May 12, 2022; (15 pages).

* cited by examiner

*Primary Examiner* — Emmanuel M Marcelo
(74) *Attorney, Agent, or Firm* — K&L Gates LLP

(57) ABSTRACT

[Problem] To provide a fishing reel including a controller capable of maintaining a low power consumption state based on the rotation state of a spool and the state of a clutch.
[Solution] A fishing reel according to an embodiment of the present invention includes a spool, a power supply, a controller, a clutch, and a clutch state detector, wherein the controller is configured to switch between a first state of high power consumption and a second state of lower power consumption than the first state, and to switch from the second state to the first state when the clutch detector detects the off-state of the clutch.

9 Claims, 6 Drawing Sheets

FISHING REEL

TECHNICAL FIELD

The present invention relates to a fishing reel having a controller (control unit or control portion) capable of performing control based on the state of the clutch and the brake means.

BACKGROUND ART

Conventionally, various types of fishing reels capable of controlling the switching of clutches and the braking of spools are known.

As such a fishing reel, for example, Patent Literature 1 discloses a fishing reel having: a spool rotatably supported by a reel body; a clutch mechanism that transmits or cuts the winding power to the spool; a clutch operating motor that is connected to the clutch mechanism through a power transmission mechanism and switches the clutch mechanism to a fishing line winding state and a fishing line unwinding state; a detection means for detecting the ON/OFF-state of the clutch; and a braking means for braking the rotation of the spool at the time of switching the clutch from ON to OFF based on the detection results from the detection means.

Further, Patent Literature 2 discloses an electric fishing reel having: a clutch mechanism that switches the spool rotatably supported by the reel body to the winding state and the spool-free state; a spool state detection means for outputting a spool-free state signal when the spool is in the spool-free state; a line length calculation means for calculating a line length based on an unwinding rotation signal and a winding rotation signal from a rotating body rotated by unwinding and winding a fishing line wound on the spool; a display (displaying unit or displaying portion) that displays a line length calculated by the line length calculation means; a solenoid that interlocks with a clutch mechanism and that switches and returns the clutch mechanism in a spool-free state to a winding state; a solenoid actuation means for outputting a solenoid actuation signal to a solenoid when inputting a spool-free state signal from the spool state detection means; a solenoid non-operation detection means for inputting a solenoid actuation signal and then, outputting a solenoid non-operation signal when a spool-free state signal is input after a predetermined time; and a notification means for inputting a solenoid non-operation signal and outputting a notification signal to a notification device.

PRIOR ART LITERATURE

Patent Literature

[Patent Literature 1] Japanese Patent Application Publication No. H05-168380
[Patent Literature 2] Japanese Utility Model Application Publication No. H08-001666

SUMMARY OF THE INVENTION

Problems to be Solved by the Invention

However, in the configuration according to Patent Literature 1, though the braking force of the spool can be electrically controlled according to the state of the clutch mechanism, there is a problem that it is necessary to maintain a state in which power is supplied for braking the spool regardless of the state of the clutch mechanism, which makes it difficult to reduce power consumption.

In addition, in the configuration according to Patent Literature 2, though the switching of the clutch mechanism can be made controllable depending on the state of the spool, there is a problem that it is necessary to maintain a state in which power is supplied to the solenoid actuation means regardless of the state of the spool, which similarly makes it difficult to reduce power consumption.

The present invention was made in view of the above circumstances, and an object thereof is to provide a fishing reel having a controller capable of maintaining a low power consumption state based on the rotation state of the spool and the state of the clutch. Other objects of the present invention will become apparent upon reference to this specification in its entirety.

Means of Solving the Problems

A fishing reel according to an embodiment of the present invention includes a spool, a power supply, a controller, a clutch, and a clutch state detector (clutch state detecting unit or clutch state detecting portion), wherein the controller is configured to switch between a first state of high power consumption and a second state of lower power consumption than the first state, and to switch from the second state to the first state when the clutch detector detects the off-state of the clutch.

In a fishing reel according to an embodiment of the present invention, the clutch detector is configured to switch from the first state to the second state when detecting the on-state of the clutch.

A fishing reel according to an embodiment of the present invention includes a spool, a power supply, a controller, and a spool state detector (spool state detecting unit or spool state detecting portion) that detects the rotation state of the spool, wherein the controller is configured to switch between a first state of high power consumption and a second state of lower power consumption than the first state, and to switch from the second state to the first state when the spool state detector detects the forward rotation of the spool.

In a fishing reel according to an embodiment of the present invention, the spool state detector is configured to switch from the first state to the second state when detecting the backward rotation of the spool.

A fishing reel according to an embodiment of the present invention includes a spool, a power supply, a controller, and a spool state detector that detects the rotation state of the spool, wherein the controller is configured to switch between a first state of high power consumption and a second state of lower power consumption than the first state, and to switch from the second state to the first state when the spool state detector detects the rotation of the spool at a rotation speed of 500 rpm or more.

In a fishing reel according to an embodiment of the present invention, a spool state detector is configured to switch from the first state to the second state when the spool state detector detects the rotation of the spool at a rotation speed of less than 500 rpm.

A fishing reel according to an embodiment of the present invention includes a flight distance measurer (flight distance measuring unit or flight distance measuring portion), wherein the controller switches the power consumption state of the flight distance measurer so that the first state is a measurable state and the second state is a measurement stop state.

A fishing reel according to an embodiment of the present invention includes a communication processor (communication processing unit or communication processing portion), wherein the controller switches the power consumption state of the communication processor so that the first state is a communicable state and the second state is an uncommunicable state.

A fishing reel according to an embodiment of the present invention includes a brake (braking unit or braking portion) of a spool, wherein the controller switches the power consumption state of the brake so that the first state is a braking force changeable state and the second state is a braking force unchangeable state.

A fishing reel according to an embodiment of the present invention includes a drag brake (drag braking unit or drag braking portion) of the spool, wherein the controller switches the power consumption state of the drag brake so that the first state is a state capable of generating a drag force, and the second state is a state with no drag force.

A fishing reel according to an embodiment of the present invention includes a spool, a main body supporting the spool, a handle provided on one side of the main body, a detected portion extending in the other lateral direction of the main body in response to an operation of the clutch, and a detected portion state detector (detected portion state detecting unit or detected portion state detecting portion) that detects the state of the detected portion, wherein the power supply is provided on the other side of the main body and is configured to supply power to the detected portion state detector.

Effect of the Invention

According to the above-described embodiments, it is possible to greatly reduce power consumption by providing a controller capable of maintaining a low power consumption state according to the rotation state of the spool or the state of the clutch.

MODES FOR CARRYING OUT THE INVENTION

Figure 1:
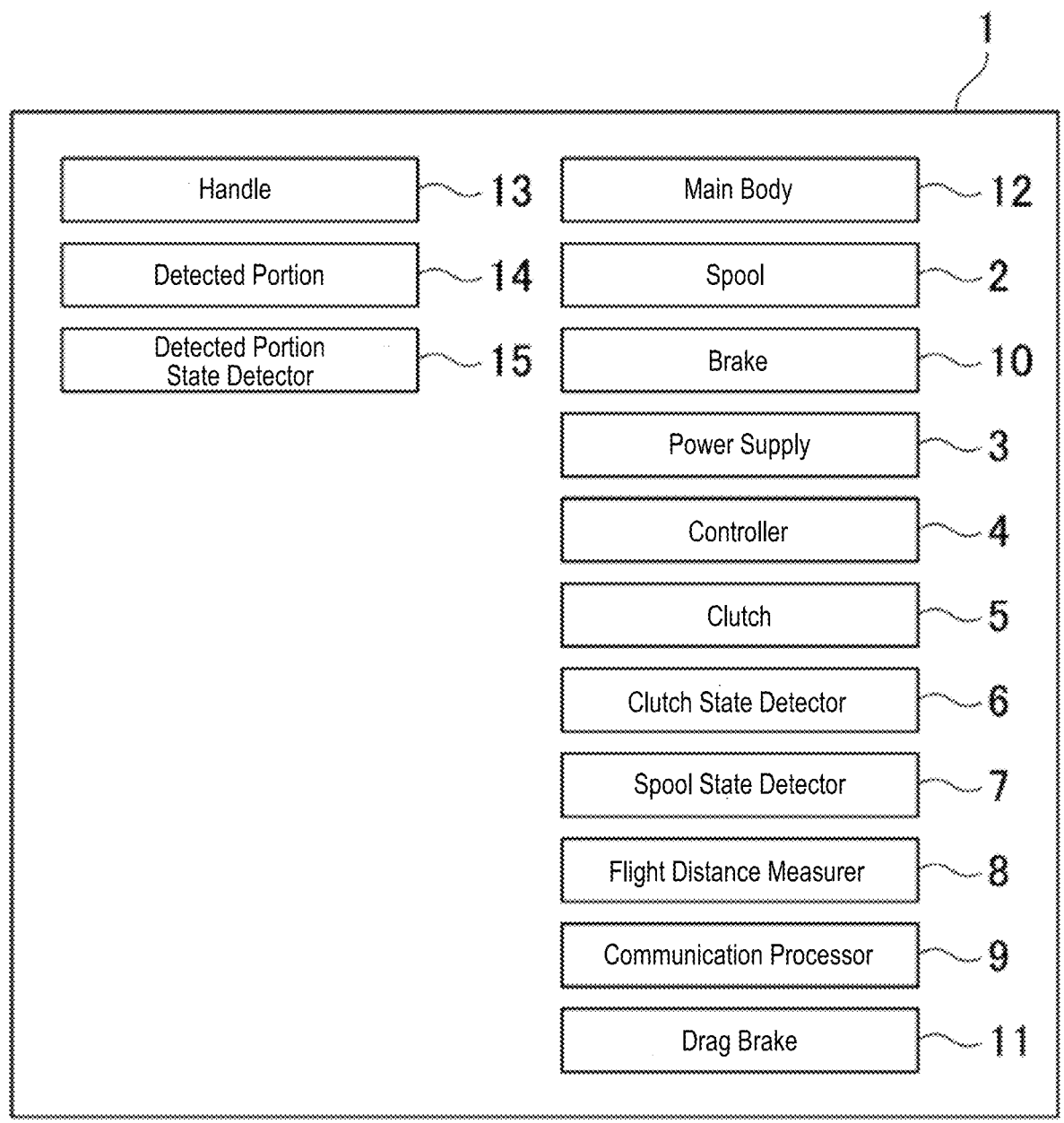
FIG. 1 shows a diagram illustrating a fishing reel 1 according to an embodiment of the present invention.

Hereinafter, embodiments of a locking device according to the present invention will be described in detail with reference to the accompanying drawings. Structures common in a plurality of drawings are denoted by the same reference numerals in a plurality of drawings. It should be noted that each of the drawings is not necessarily scaled for convenience of explanation.

Figure 10:
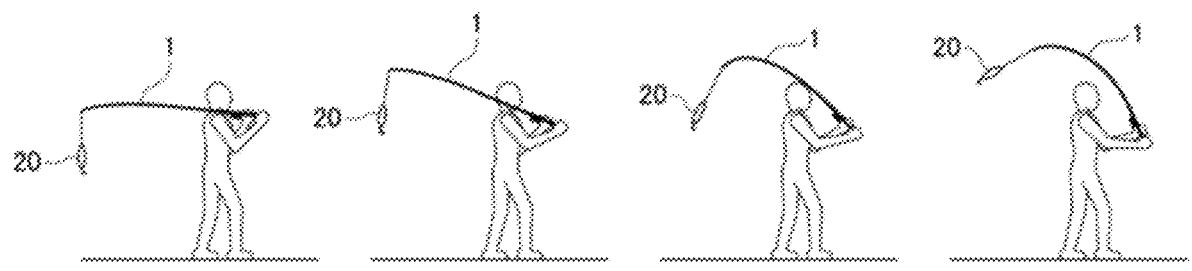
FIGS. 10(a)-10(g) shows diagrams illustrating a procedure for casting and retrieving fishing equipment such as a lure using a reel including the fishing reel 1 according to an embodiment of the present invention.
Figure 10:
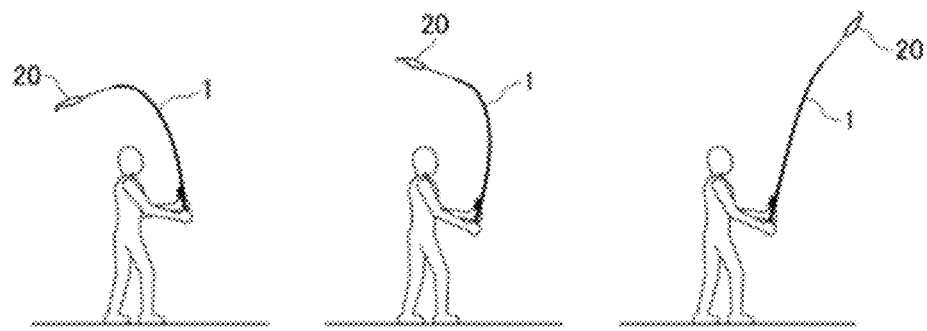

First, an example of a procedure for casting and retrieving fishing equipment such as a lure using a general reel including the reel will be described with reference to FIGS. 10(a)-10(g). As shown in FIG. 10(a), when a lure 20 is adjusted to a predetermined length from the rod tip by an operation member 3, a clutch 5 is turned off so that it is in a spool-free state. At this time, a spool 2 is held by a thumb to prevent the fishing line from coming out due to the self-weight of the lure 20 or the like.

Then, as shown in FIGS. 10(b) to 10(d), an initial speed is given to the lure 20 by swinging the fishing rod. Next, as shown in FIG. 10(e), when the thumb is released from the spool 2 at a timing where the speed and the discharge direction of the lure become appropriate, the lure can be cast.

Further, as shown in FIG. 10(g), the cast lure starts decelerating by receiving tension from the fishing line and air resistance. On the other hand, the spool 2 starts to rotate backward because of the tension from the fishing line. When the release speed of the fishing line and the flying speed of the lure coincide, the rotation speed of the spool 2 reaches its maximum, and the fishing line loses tension. The lure then continues to decelerate due to air resistance and the like. At this time, if the spool 2 continues to rotate at a high speed due to inertia, the release speed of the fishing line exceeds the flying speed of the lure. As a result, the fishing line is excessively released, and becomes tangled in the reel. To avoid this, a predetermined braking force is applied to the spool 2 by the brake (braking unit or braking portion) 10.

Then, when the height of the lure falls sufficiently, the lure lands on the water. At this time, if the braking force is too large, the casting distance of the lure becomes shorter. If the braking force is too small, the line is tangled, and winding and releasing cannot be performed normally. The appropriate value of the braking force varies depending not only on the size of the lure and the length of the rod, but also on various influences such as the casting method, wind, natural circumstances and the like.

After the lure is submerged in the water to a prescribed depth after landing on the water, the clutch 5 is operated and turned on to enable the spool 2 to be operated by a handle 13, and the lure is moved (retrieved). This allows the lure to be taken by a fish. The catch varies depending on the winding speed at this time. Further, when a predetermined or more tension is applied to the fishing line by the fish or any obstacle in this state, the spool 2 is idly rotated by the action of a drag brake 11, whereby breakage of the fishing line can be avoided.

First, the fishing reel 1 according to an embodiment of the present invention will be described with reference to FIGS. 1 and 2. As illustrated, the fishing reel 1 according to an embodiment of the present invention includes the spool 2, a power supply 3, a controller 4, the clutch 5, and the clutch state detector 6, wherein the controller 4 is configured switch between a first state of high power consumption and a second state of lower power consumption than the first state, and to switch from the second state to the first state (S2) when the clutch detector 6 detects the off-state of the clutch 5 (S1). For convenience, the initial state (S0) is the second state of low power consumption.

In the fishing reel 1 according to an embodiment of the present invention, the clutch detector 6 is configured to switch from the first state to the second state (S4) when detecting the on-state of the clutch 5 (S3). As described above, when a user is winding the fishing line by handle operation, the clutch is in an on-state. When the user casts fishing equipment such as a lure, the clutch is in an off-state. As described above, since the operation by the user can be inferred by detecting the state of the clutch, it is possible to switch to a process appropriate to the state.

In the fishing reel 1 according to an embodiment of the present invention, it is possible to significantly reduce power consumption by providing the controller 4 capable of maintaining a low power consumption state based on the state of the clutch 5.

Figure 2:
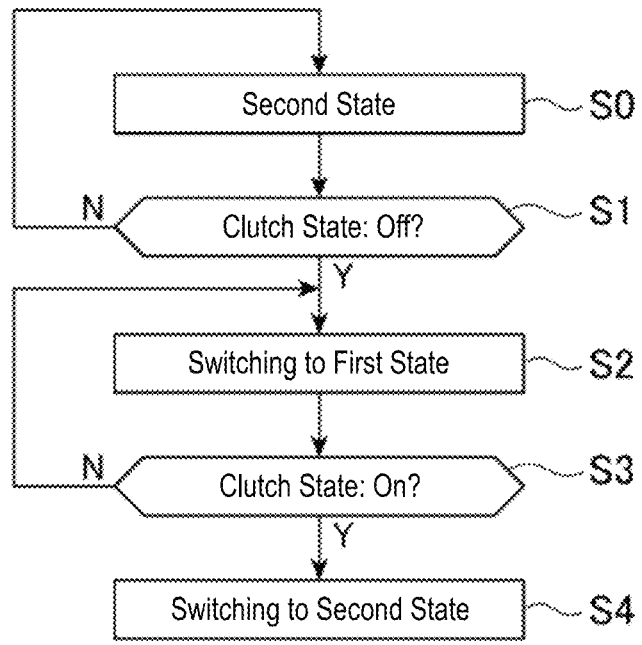
FIG. 2 shows a diagram illustrating the operation of the controller of the fishing reel 1 according to an embodiment of the present invention.
Figure 3:
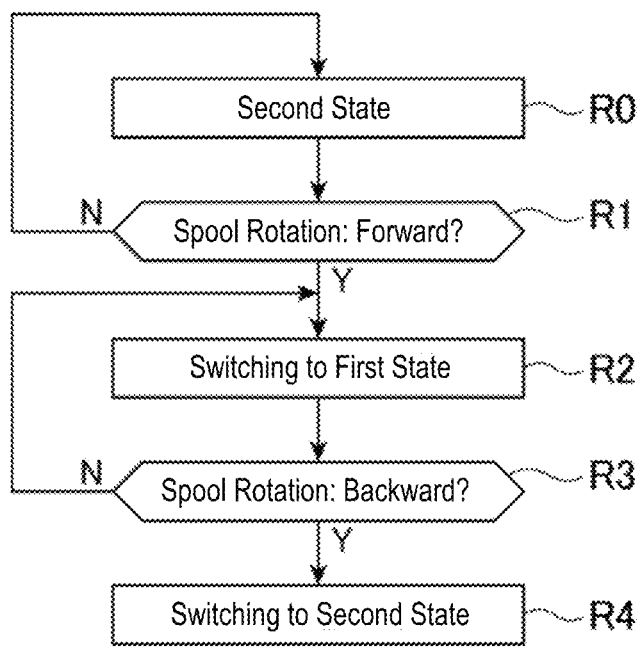
FIG. 3 shows a diagram illustrating the operation of the controller of the fishing reel 1 according to an embodiment of the present invention.

With reference to FIGS. 1 and 3, the fishing reel 1 according to an embodiment of the present invention will be described. As illustrated, the fishing reel 1 according to an embodiment of the present invention includes the spool 2, the power supply 3, the controller 4, and a spool state detector 7 that detects the rotation state of the spool 2, wherein the controller 4 is configured to switch between a first state of high power consumption and a second state of lower power consumption than the first state, and to switch from the second state to the first state (R2) when the spool state detector 7 detects a forward rotation of the spool 2 (R1). For convenience, the initial state (R0) is the second state of low power consumption.

In the fishing reel 1 according to an embodiment of the present invention, the spool state detector 7 is configured to switch from the first state to the second state (R4) when detecting the backward rotation of the spool 2 (R3).

In the fishing reel 1 according to an embodiment of the present invention, it is possible to greatly reduce power consumption by providing the controller 4 capable of maintaining a low power consumption state based on the rotation state of the spool 2.

Figure 4:
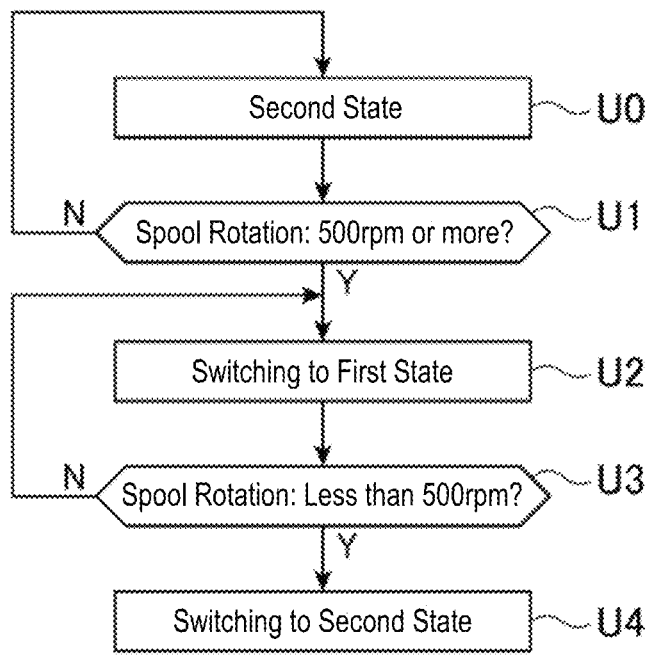
FIG. 4 shows a diagram illustrating the operation of the controller of the fishing reel 1 according to an embodiment of the present invention.

With reference to FIGS. 1 and 4, the fishing reel 1 according to an embodiment of the present invention will be described. As illustrated, the fishing reel 1 according to an embodiment of the present invention includes the spool 2, the power supply 3, the controller 4, and the spool state detector 7 that detects the rotation state of the spool 2, wherein the controller 4 is configured to switch between a first state of high power consumption and a second state of lower power consumption than the first state, and to switch from the second state to the first state (U2) when the spool state detector 7 detects the rotation of the spool 2 at a rotation speed of 500 rpm or more (U1). For convenience, the initial state (U0) is the second state of low power consumption.

In the fishing reel 1 according to an embodiment of the present invention, the spool state detector 7 is configured to switch from the first state to the second state (U4) when detecting the rotation of the spool 2 at a rotation speed of less than 500 rpm (U3).

In the fishing reel 1 according to an embodiment of the present invention, it is possible to greatly reduce power consumption by providing the controller 4 capable of maintaining a low power consumption state according to the rotation state of the spool 2.

Figure 5:
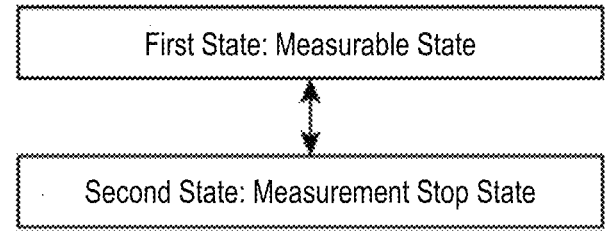
FIG. 5 shows a diagram illustrating the power consumption state of the fishing reel 1 according to an embodiment of the present invention.

Next, with reference to FIGS. 1 and 5, the fishing reel 1 according to an embodiment of the present invention will be described. As illustrated, the fishing reel 1 according to an embodiment of the present invention includes the flight distance measurer 8, wherein the controller 4 switches the state of power consumption of the flight distance measurer 8 so that the first state is a measurable state and the second state is a measurement stop state.

Since the flight distance can be measured at the time of casting, the flight distance measurer is set to a measurable state when the clutch is off, and is set to a measurement stop state when the clutch is on, as described above, thereby allowing a significant reduction in power consumption. In addition, the spool rotates in the backward direction at the time of casting. Therefore, it is possible to significantly reduce power consumption by switching between the measurable state and the measurement stop state according to the rotation direction of the spool. At the time of casting, the spool generally rotates at a higher speed than at the time of retrieval. Therefore, making it measurable at a predetermined rotation speed or more significantly reduces power consumption.

Figure 6:
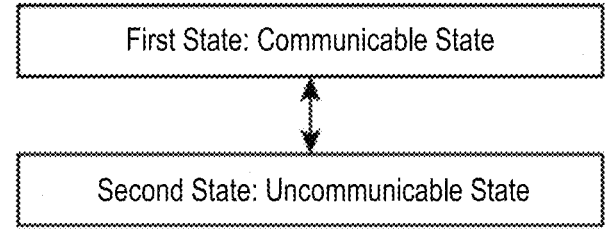
FIG. 6 shows a diagram illustrating the power consumption state of the fishing reel 1 according to an embodiment of the present invention.

Next, with reference to FIGS. 1 and 6, the fishing reel 1 according to an embodiment of the present invention will be described. As illustrated, the fishing reel 1 according to an embodiment of the present invention includes a communication processor 9, wherein the controller 4 switches the power consumption state of the communication processor 9 so that the first state is a communicable state and the second state is an uncommunicable state.

In general, the communication processor 9 is, when performed simultaneously with other processing such as flight distance measurement and adjustment of braking force, likely to cause a failure such as communication failure. Therefore, it is desirable to perform the processing at a different timing from those of the others. When adjusting the braking force or measuring the flight distance at the time of casting, communication is enabled when the clutch is on and is disabled when the clutch is off. This reduces the risk of performing communication processing when any other processing is performed. Further, when retrieved data is measured or a drag force is electronically adjusted upon retrieval without performing the above-mentioned processing at the time of casting, communication is disabled when the clutch is on, and communication is enabled when the clutch is off. This reduces the risk of performing communication processing when any other processing is performed.

Figure 7:
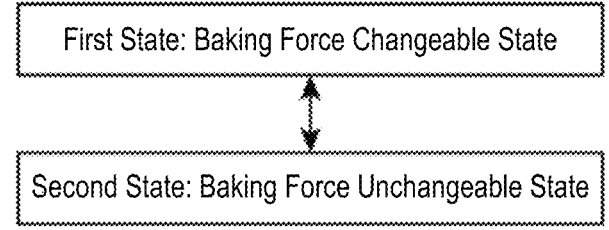
FIG. 7 shows a diagram illustrating the power consumption state of the fishing reel 1 according to an embodiment of the present invention.

Next, with reference to FIGS. 1 and 7, the fishing reel 1 according to an embodiment of the present invention will be described. The fishing reel 1 according to an embodiment of the present invention includes the brake 10 of the spool 2, wherein the controller 4 switches the power consumption state of the brake 10 so that the first state is a braking force changeable state, and the second state is a braking force unchangeable state. As described above, it is necessary to apply the braking force to the spool 2 at the time of casting, but not at the time of retrieval. Therefore, when a type with a braking force electronically adjustable is selected for the brake 10, power is required to adjust the braking force, but it is possible to significantly reduce power consumption by disabling the adjustment when the clutch is on, and enabling the adjustment when the clutch is off.

Figure 8:
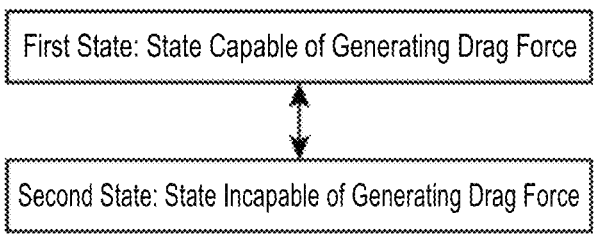
FIG. 8 shows a diagram illustrating the power consumption state of the fishing reel 1 according to an embodiment of the present invention.

Next, with reference to FIGS. 1 and 8, the fishing reel 1 according to an embodiment of the present invention will be described. The fishing reel 1 according to an embodiment of the present invention includes the drag brake 11 of the spool 2, wherein the controller 4 switches the power consumption state of the drag break 11 so that the first state is a state capable of generating a drag force and the second state is a state with no drag force. As described above, the drag force needs to be adjusted upon retrieval, and at the time of casting, there is no problem even if there is no drag force. Therefore, it is possible to significantly reduce power consumption when the drag force is generated when the clutch is on, and there is no drag force when the clutch is off.

Figure 9:
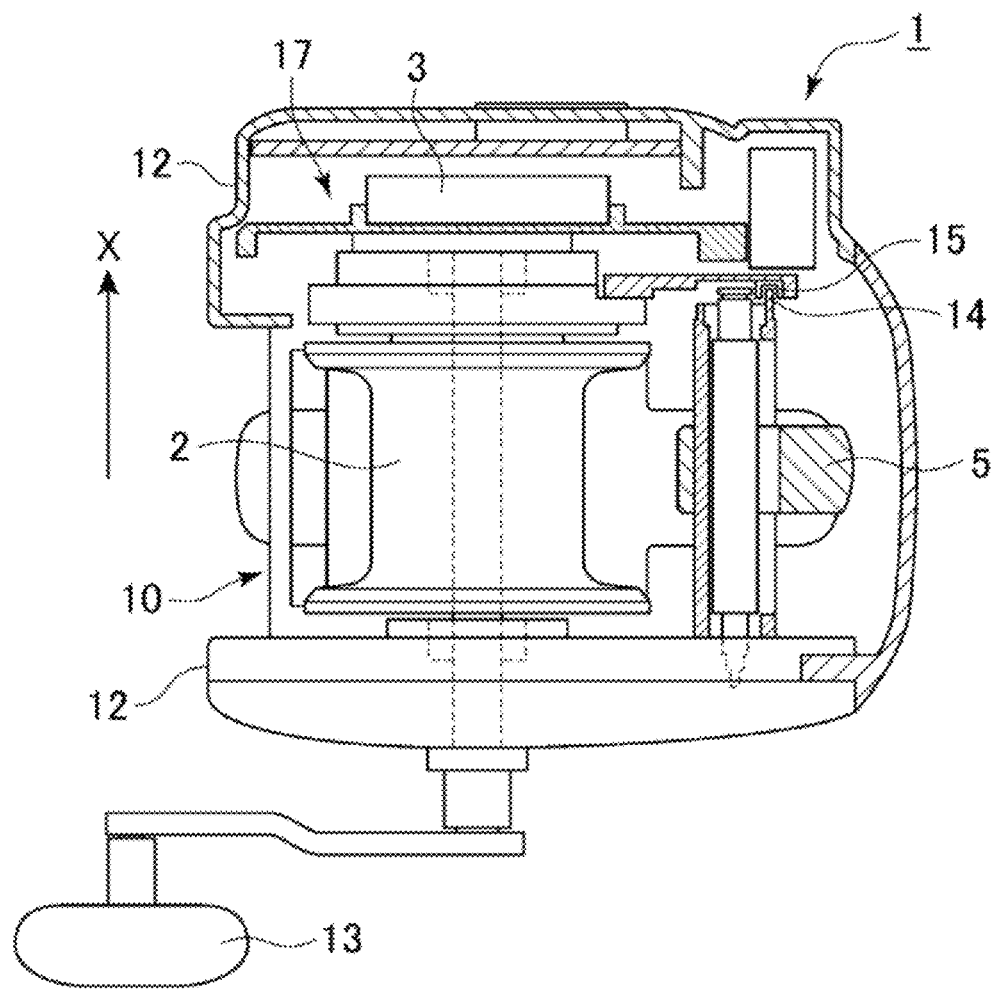
FIG. 9 shows a diagram illustrating the fishing reel 1 according to an embodiment of the present invention.
Figure 11:
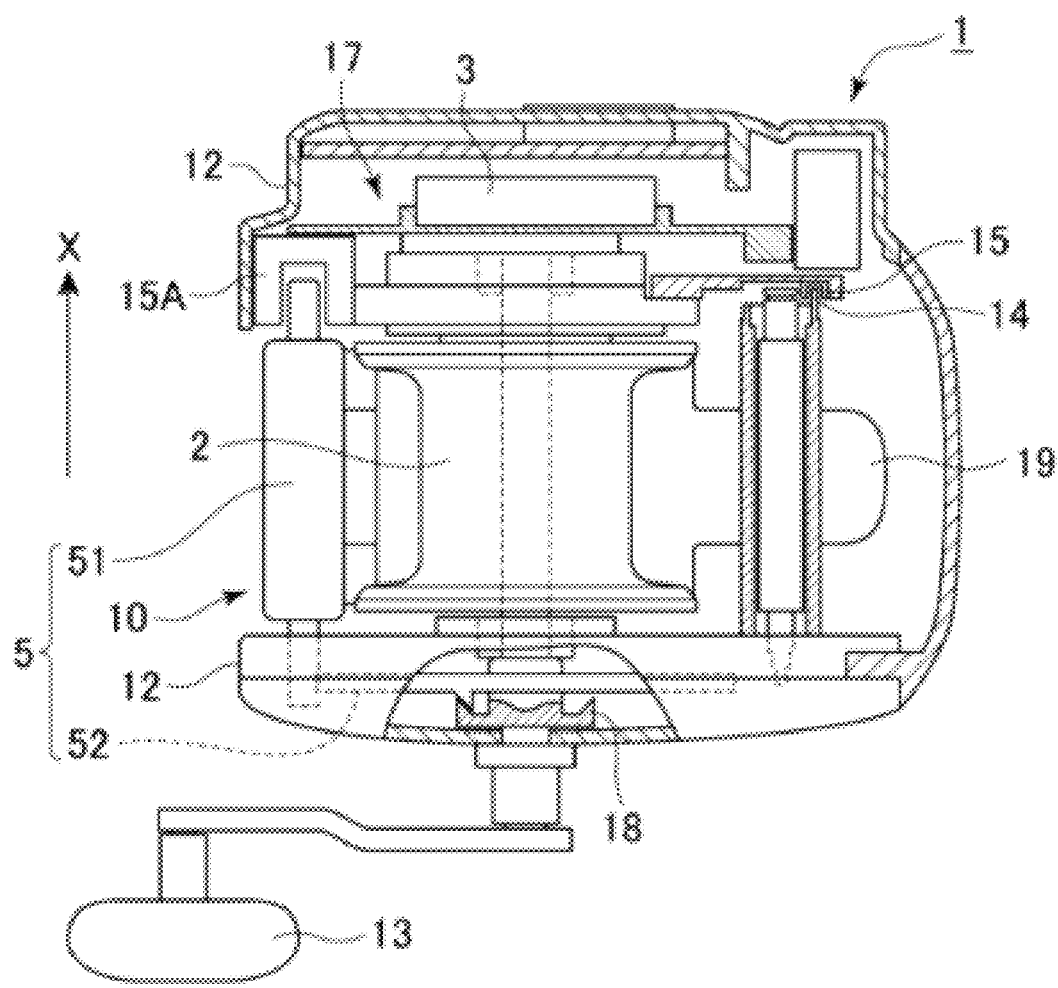
FIG. 11 shows a diagram illustrating the fishing reel 1 according to an embodiment of the present invention.

Next, with reference to FIGS. 9 and 11, the fishing reel 1 according to an embodiment of the present invention will be described. As schematically shown in FIG. 9, the fishing reel 1 according to an embodiment of the present invention includes the spool 2, a main body 12 supporting the spool 2, the handle 13 provided on a one side 16 of the main body 12, a transmission member 18 that transmits the movement of the handle to the spool, a clutch operating member 51 and a clutch cam 52 that constitute the clutch 5, a detected portion 14 extending in the other lateral direction X of the main body 12 in response to the operation of the clutch 5, and a detector 15 that detects the state of the detected portion 14, wherein the power supply 3 is provided on the other side 17 of the main body 12, and is configured to supply power to the detected portion state detector 15.

When a user operates the clutch operating member 51, the clutch cam 52 rotates substantially coaxially with the spool 2. This rotation movement allows the cam to move a portion of the transmission member and to switch from being transmissible to non-transmissible and vice versa between the handle 13 and the spool 2. The detected portion may be provided in part of the clutch operating member 51. Further, in some reels, in order to rotate a fishing line guide (fishing line guiding unit or finish line guiding portion), an oscillate cylinder 14 is rotated in conjunction with the movement of the clutch cam 52. In this case, a detected portion may be provided in part of the fishing line guide 19 as in FIG. 9.

Here, as the detected portion 14, for example, but not limited to, a light shielding plate provided at the end of the oscillate cylinder may be used. Further, the detected portion state detector 15 may be, for example, but not limited to, a light transmitting photosensor. Alternatively, the detected portion 14 may be a reflective photosensor reflector. Instead of the foregoing, a magnet may be used in combination with a magnetic sensor, or a protrusion may be used in combination with a contact switch.

Conventionally, since the clutch return operation is interlocked with the handle operation, the clutch mechanism is generally laid out on the handle side, the clutch detection means is also disposed on the handle side, and the brake that prevents backlash is often disposed on the handle side with a lot of space. Therefore, it is not easy to connect them electrically and mechanically because the brake and the clutch detection means are arranged opposite each other across the spool.

In contrast, in the fishing reel 1 according to an embodiment of the present invention, it is possible to arrange the power supply and the clutch detection means on the side opposite to the handle side; therefore, the reel can be downsized in its entirety.

The dimension, material and arrangement of each component described herein are not limited to those explicitly described in the embodiments, and each component can be modified to have any dimension, material and arrangement that may be within the scope of the present invention. Further, components not explicitly described herein may be added to the described embodiments, or some of the components described in each embodiment may also be omitted.

DESCRIPTION OF THE NUMERICAL REFERENCES

1 Fishing reel
2 Spool
3 Power supply
4 Controller
5 Clutch
6 Clutch status detector
7 Spool status detector
8 Flight distance measurer
9 Communication processor
10 Brake
11 Drag brake
12 Main body
13 Handle
14 Detected portion
15 Detected portion state detector
16 One side
17 Other side
18 Transmission member
19 Fishing line guide
X Other lateral direction

What is claimed is:

1. A fishing reel comprising:
a spool, a power supply, a controller, a clutch, and a clutch state detector,
wherein the controller switches between a first state of high power consumption, and a second state of low power consumption lower than the first state, and
wherein the clutch state detector switches from the second state to the first state when detecting an off-state of the clutch.

2. The fishing reel according to claim 1, wherein the clutch state detector switches from the first state to the second state when detecting an on-state of the clutch.

3. The fishing reel according to claim 1, comprising a flight distance measurer, wherein the controller switches a power consumption state of the flight distance measurer so that the first state is a measurable state, and the second state is a measurement stop state.

4. The fishing reel according to claim 1, comprising a communication processor, wherein the controller switches a power consumption state of the communication processor so that the first state is a communicable state, and the second state is an uncommunicable state.

5. The fishing reel according to claim 1, comprising a brake for the spool, wherein the controller switches a power consumption state of the brake so that the first state is a braking force changeable state, and the second state is a braking force unchangeable state.

6. The fishing reel according to claim 1, comprising a drag brake for the spool, wherein the controller switches a power consumption state of the drag brake so that the first state is a state capable of generating a drag force, and the second state is a state with no drag force.

7. The fishing reel according to claim 1, comprising: a main body supporting the spool; a handle provided on one side of the main body; a detected portion extending in a lateral direction of the main body in response to an operation of the clutch; and a detected portion state detector that detects a state of the detected portion, wherein the power supply is provided on another side of the main body and supplies power to the detected portion state detector.

8. A fishing reel comprising:
a spool, a power supply, a controller, and a spool state detector that detects a rotation state of the spool,
wherein the controller switches between a first state of high power consumption, and a second state of low power consumption lower than the first state, and
wherein the spool state detector switches from the second state to the first state when detecting a rotation of the spool at a rotation speed of 500 rpm or more.

9. The fishing reel according to claim 8, wherein the spool state detector switches from the first state to the second state when detecting the rotation of the spool at a rotation speed of less than 500 rpm.

* * * * *